(12) United States Patent
Audenaert et al.

(10) Patent No.: US 8,329,801 B2
(45) Date of Patent: Dec. 11, 2012

(54) POLYAMIDE-BASED HIGH-PERFORMANCE SELF-ADHESIVE POWDER WITHOUT ADHESION PROMOTER

(75) Inventors: Marc Audenaert, Bernay (FR); Jean-Charles Durand, Evreux (FR)

(73) Assignee: Arkema France, Colombes (FR)

( * ) Notice: Subject to any disclaimer, the term of this patent is extended or adjusted under 35 U.S.C. 154(b) by 38 days.

(21) Appl. No.: 12/440,322

(22) PCT Filed: Sep. 7, 2007

(86) PCT No.: PCT/FR2007/051893
§ 371 (c)(1),
(2), (4) Date: Jan. 5, 2010

(87) PCT Pub. No.: WO2008/029070
PCT Pub. Date: Mar. 13, 2008

(65) Prior Publication Data
US 2010/0113670 A1    May 6, 2010

Related U.S. Application Data

(60) Provisional application No. 60/847,882, filed on Sep. 28, 2006.

(30) Foreign Application Priority Data

Sep. 8, 2006   (FR) ...................... 06 53621

(51) Int. Cl.
C08K 3/26 (2006.01)
B32B 15/08 (2006.01)

(52) U.S. Cl. ........................................ 524/425; 428/458
(58) Field of Classification Search .................. 524/425; 428/458
See application file for complete search history.

(56) References Cited

U.S. PATENT DOCUMENTS

| 5,907,006 A | 5/1999 | Rennie et al. |
| 6,011,100 A | 1/2000 | Douais et al. |
| 6,251,515 B1 * | 6/2001 | Douais et al. ................. 428/330 |

* cited by examiner

*Primary Examiner* — Peter Szekely
(74) *Attorney, Agent, or Firm* — Millen, White, Zelano & Branigan, P.C.

(57) ABSTRACT

The invention provides a self-adhesive composition in powder form for the coating of metallic substrates, composed of homopolyamide (A) selected from PA11 and PA12, copolyamide (B), calcium carbonate and, optionally, at least one component selected from a pigment or dye, an anti-crater agent or spreading agent, a reductant, an antioxidant, a reinforcing filler, a UV stabilizer, a fluidizing agent and a corrosion inhibitor, said composition being devoid of silane-type adhesion promoter or of an adhesion promoter containing an epoxy, alcohol and/or carboxylic acid function, or derivatives thereof, and having a dry-state modulus and/or a wet-state modulus of greater than or equal to 2200 MPa [Standard NF EN ISO 527]. The invention also relates to a composite material comprising a metallic substrate directly coated with a coating film resulting from the melting of said composition, the adhesion of the coating film to the metallic substrate being greater than 3 after 2000 hours of salt fog before and after drying, in accordance with Standard NFT 58-112.

6 Claims, 1 Drawing Sheet

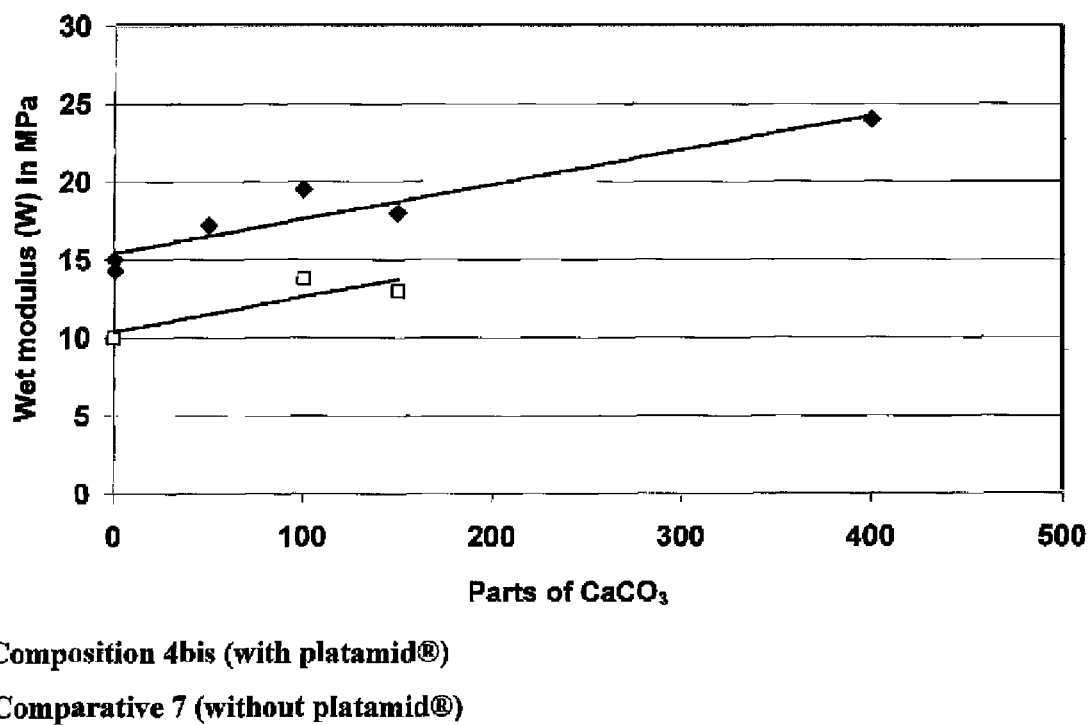
Influence of Platamid® on the wet modulus
♦ Composition 4bis (with platamid®)
□ Comparative 7 (without platamid®)

POLYAMIDE-BASED HIGH-PERFORMANCE SELF-ADHESIVE POWDER WITHOUT ADHESION PROMOTER

This application claims benefit, under U.S.C. §119 or §365 of French Application Number FR 0653621, filed Sep. 8, 2006; U.S. 60/847,882 filed Sep. 28, 2006; and PCT/FR2007/051893 filed Sep. 7, 2007.

FIELD OF THE INVENTION

The invention relates to a polyamide-based powder composition for the coating of metal substrates. It relates to the field of high performance polyamide coatings providing anti-corrosion protection to metals, and more particularly to powder paints applied by a fluidized-bed dipping process, without however limiting the scope to this type of process.

BACKGROUND OF THE INVENTION

Polyamides are commonly used for the coating of metal substrates, owing especially to their good mechanical properties such as abrasion resistance, impact strength and their chemical inertness towards numerous products such as hydrocarbons, mineral acids and bases. But it is known that the adhesion of polyamides to metals is poor.

To overcome this drawback, the metal support is generally coated with an undercoat, called an adhesion primer, intended to ensure bonding and mechanical anchoring of the polyamide powder. In general the adhesion primer that is used is based on thermosetting resins and is applied in powder form, in solution or in suspension in organic or aqueous solvents. It is necessary therefore to allow for additional facilities, a continuance of the coating operations and therefore a sizeable increase in the production costs. It is increasingly preferred therefore to do without the adhesion primer and to improve the direct adhesion of the coating onto the substrate.

In Patent EP 0 412 288, mixtures of polyamides and epoxy/sulphonamide resins have also been described that can be used to coat metal substrates without this time using an adhesion primer undercoat. These polyamide and epoxy/sulphonamide resin powder mixtures are applied to the substrate using an electrostatic spray gun. Placing the substrate coated in this way into an oven is then enough to melt the powder and obtain a uniform coating. It is also possible to preheat the substrate to above the melting point of the powder and to dip it in a fluidized bed of powder.

In Application PCT/FR95/01740, pulverulent compositions based on polyamide, on a copolymer of ethylene and unsaturated carboxylic acids or their vinyl or nonvinyl esters and possibly on an ethylene/vinyl alcohol copolymer have been proposed.

The Applicant has now found another polyamide-based powder composition free of adhesion promoter, that can be used to coat metal substrates, and that does not require an adhesion primer layer and that has a very good resistance to salt fog.

SUMMARY OF THE INVENTION

The subject of the invention is a self-adhesive pulverulent composition in powder form for the coating of metallic substrates, composed of homopolyamide (A) selected from PA11 and PA12, copolyamide (B), calcium carbonate and, optionally, at least one component selected from a pigment or dye, an anti-crater agent or spreading agent, a reductant, an anti-oxidant, a reinforcing filler, a UV stabilizer, a fluidizing agent and a corrosion inhibitor, said composition being devoid of silane-type adhesion promoter or of an adhesion promoter containing an epoxy, alcohol and/or carboxylic acid function, or derivatives thereof, and having a dry-state modulus and/or a wet-state modulus of greater than or equal to 2200 MPa [Standard NF EN ISO 527].

According to one embodiment, the reinforcing filler is chosen from talc, calcium and manganese carbonates, potassium and aluminium silicates and dispersed nanofillers such as carbon nanotubes and silica.

Another subject of the invention is a composite material comprising a metal substrate directly covered by a coating layer resulting from the melting of a composition defined above.

According to one embodiment, the composite material is characterized in that the adhesion of the coating layer to the metal substrate is greater than or equal to 3 after 2000 hours in salt fog, before and after drying, in accordance with the NFT 58-112 standard.

The invention also relates to the use of a preceding composition to manufacture a metal substrate coating.

According to one embodiment, the use is characterized in that the coating is a paint.

DETAILED DESCRIPTION OF THE INVENTION

As regards the term "copolyamide (B)", it is understood to mean condensation products of lactams, of amino acids or of a diacid with a diamine and, as a general rule, any polymer formed by units linked together by amide functions.

As examples of lactams, mention may be made of lauryl-lactam (lactam-12), caprolactam (lactam-6), oenantholactam (lactam-11), capryllactam or their mixtures.

As examples of alpha-omega aminocarboxylic acids, mention may be made of 6-aminohexanoic acid, 7-aminoheptanoic acid, 11-aminoundecanoic acid or 12-aminododecanoic acid.

As examples of cycloaliphatic diamines, mention may be made of the isomers of bis(4-aminocyclohexyl)methane (BACM), bis(3-methyl-4-aminocyclohexyl)methane (BMACM) and para-aminodicyclohexylmethane (PACM), isophoronediamine (IPDA), 2,2-bis(3-methyl-4-aminocyclohexyl)propane (BMACP), 2,6-bis(aminomethyl)-norbornane (BAMN) and piperazine.

As examples of noncycloaliphatic diamines, mention may be made of linear aliphatic diamines, such as 1,4-tetramethylenediamine, 1,6-hexamethylenediamine, 1,9-nonamethylenediamine, 1,10-decamethylenediamine, 1,12-do decamethylenediamine, trimethylhexamethylenediamine.

As examples of aliphatic carboxylic diacids, mention may be made of aliphatic carboxylic diacids having from 6 to 36 carbon atoms, in particular 1,5-pentanedioic acid (glutaric acid), 1,6-hexanedioic acid (adipic acid), 1,7-heptanedioic acid (pimelic acid), 1,8-octanedioic acid (suberic acid), 1,9-nonanedioic acid (azelaic acid), 1,10-decanedioic acid (sebacic acid), 1,12-dodecanedicarboxylic acid, 1,14-tetradecanedicarboxylic acid, 1,18-octadecanedicarboxylic acid and isostearic acid.

As examples of nonaliphatic carboxylic diacids, mention may be made of aromatic diacids, in particular isophthalic acid (I), terephthalic acid (T) and their mixtures.

Any type of equipment used for the polycondensation of polyamides may be employed. Mention may be made, by way of example, of a reactor equipped with stirring of around 50 rpm, which may withstand a pressure of 20 bar. The polycondensation time may be between 5 and 15 hours and, preferably, between 4 and 8 hours. When the polycondensation processes are finished, a solid product is obtained that is milled to the desired particle size. Generally, the particle size of the powders that conform to the invention may be between 5 microns and 1 mm.

As regards the term "homopolyamide (A)" defined above, it is chosen the group consisting of polyamide 11 (PA11) that can be obtained by condensation of 11-aminoundecanoic acid or of lactam-11 and of polyamide 12 (PA-12) that can be obtained by condensation of 12-aminododecanoic acid or of lactam-12.

The composition in the sense of the invention is free of adhesion promoters such as the adhesion promoters bearing at least one alcohol, epoxy, carboxylic acid functional group or functional group of their derivatives (anhydride, ester, etc.).

It must additionally have a dry modulus and a wet modulus greater than or equal to 2200 MPa.

Generally, it is observed that a composition in the sense of the invention produces a coating of which the adhesion in the wet state is almost identical to that obtained after drying the coating in an oven at 35° C.

Various other constituents may be incorporated into the composition according to the invention, such as additives and/or fillers such as pigments or dyes, anti-cratering agents or spreading agents, reducing agents, antioxidants, reinforcing fillers, UV stabilizers, processing agents or corrosion inhibitors.

As examples of reinforcing fillers, mention may be made of talc, calcium and manganese carbonates, potassium and aluminium silicates, dolomite, calcium and/or magnesium carbonates, quartz, boron nitride, kaolin, wollastonite, titanium dioxide, glass beads, mica, carbon black, mixtures of quartz, mica and chlorite, feldspar, and all dispersed nanoscale fillers such as carbon nanotubes and silica.

As examples of pigments, mention may be made of titanium dioxide, carbon black, cobalt oxide, nickel titanate, molybdenum bisulphide, aluminium flakes, iron oxides, zinc oxide, organic pigments such as phthalocyanine and anthraquinone derivatives, zinc phosphate.

By way of UV stabilizers, mention may be made of resorcinol derivatives, benzotriazoles or salicylates.

By way of antioxidants, mention may be made of copper iodide combined with potassium iodide, phenol derivatives and hindered amines.

By way of corrosion inhibitors, mention may be made of phosphosilicates and borosilicates.

The composition is produced by combining the constituents in the melt state in a mixer at a temperature between 150 and 300° C., preferably between 180 and 270° C. It is possible to prepare a masterbatch or an end product. The end product is then milled in accordance with common techniques in order to obtain a powder of the desired particle size. It is also possible to process by spraying or precipitation.

The milling may be carried out in high air absorption or cryogenically cooled machines (knife mills, hammer mills, disc mills, etc.). The powder particles obtained are selected using equipment suitable for eliminating the undesired particle size fractions, for example particles that are too coarse and/or too fine.

The present invention also relates to the use of powder compositions such as previously defined for coating metal substrates and to the substrates thus coated. The metal substrate may be chosen from a wide range of products. It may be a carbon or galvanized steel part or an aluminium or aluminium alloy part. The metal substrate may be of any thickness (for example around a tenth of a millimetre, or around several tens of centimetres). In accordance with a known technique, the metal substrate, and especially a carbon steel, aluminium or aluminium alloy substrate, could undergo one or more of the following surface treatments, this list being non-limiting: coarse cleaning, alkaline cleaning, brushing, shot peening or sandblasting, fine cleaning, hot rinsing, phosphate cleaning, iron/zinc tri-cation phosphating, chromating, cold rinsing, chromic rinsing.

As examples of metal substrates able to be coated with a composition according to the invention, mention may be made of smooth or shot-peened, cleaned steel; phosphated, cleaned steel; iron or zinc phosphated steel; Sendzimir galvanized steel; electrogalvanized steel; hot-dip galvanized steel; cataphoretically-treated steel; chromated steel; anodized steel; corundum-blasted steel; cleaned aluminium; smooth or shotblasted aluminium; and chromated aluminium.

The polyamide-based composition according to the invention is therefore applied in powder form to the metal substrate. The application of the powder composition may be carried out according to the application techniques usually employed. Among the powder application techniques, mention may be made of electrostatic spraying, hot powder coating and fluidized-bed dipping, the preferred techniques for carrying out the coating of substrates according to the invention.

In electrostatic spraying, the powder is introduced into a spray gun where it is conveyed by compressed air and passes into a nozzle held at a high potential, generally between around ten and one hundred kilovolts. The voltage applied may be of positive or negative polarity. The flow rate of powder in the spray gun is generally between 10 and 200 g/min, and preferably between 50 and 120 g/min. When it passes into the nozzle the powder becomes electrostatically charged. The powder particles conveyed by the compressed air are applied to the metal surface to be coated, said surface being itself earthed, that is to say, connected to a zero electric potential. The powder particles are retained on this surface by their electrostatic charge. These forces are strong enough so that the powder-treated article may be coated, moved and then heated in an oven at a temperature that causes the powder to melt. The electrostatic spraying of polyamide-based compositions according to the invention, regardless of the application polarity, has a definite advantage since it will especially be possible to use existing standard industrial plants that are designed for the electrostatic spraying of powder coatings with a single polarity.

In electrostatic spraying, it is possible to use a powder having an average particle size between 5 and 100 microns and preferably, between 5 and 65 microns.

In the case of the fluidized-bed dipping process, the metal substrate to be coated is first of all carefully prepared, by undergoing, for example, one or more surface treatments listed above, then it is heated in an oven to a temperature determined according to especially the nature of said substrate, its shape and the desired coating thickness. The substrate thus heated is then immersed in a powder composition according to the invention held in suspension by a gas circulating through a tank with a porous base. The powder melts in contact with the hot metal surfaces and thus forms a coating where the thickness depends on the substrate temperature and its immersion time in the powder.

The particle size of the powders used in the fluidized bed may be between 10 and 1000 microns, and preferably between 80 and 200 microns. In general, the coating thickness may be between 150 and 1000 microns, and preferably between 200 and 700 microns.

The pulverulent composition according to the invention makes it possible, amongst other things, to manufacture paints that do not comprise adhesion promoters and of which the adhesion remains constant over more than 2000 hours of exposure to salt fog at 35° C. without using an adhesion primer layer.

EXAMPLES

The following examples illustrate the invention without limiting the scope thereof. The examples and comparative examples are compositions as defined in Table 1.

1.1. Preparation of the Powder Composition

The examples and comparative examples were produced by mixing the components, defined in Table 1 below, in the melt state, then milling the product obtained.

TABLE 1

| | PA (parts) | | TiO₂ (parts) | CaCO₃ (parts) | CoPA (parts) | EVOH (parts) |
|---|---|---|---|---|---|---|
| | PA-11 | PA-12 | | | | |
| Comparative example 1 | 1000 | / | 80 | / | / | / |
| Comparative example 2 | 1000 | / | 80 | 150 | / | / |
| Comparative example 3 | 750 | / | 80 | 150 | 250 | / |
| Example 4 | 750 | / | 80 | 400 | 250 | / |
| Example 5 | / | 750 | 80 | 400 | 250 | / |
| Comparative example 6 | 750 | / | 80 | 400 | 250 | 80 |

PA-11: RILSAN ® BMNO (Arkema)
PA-12: RILSAN ® AECNO (Arkema)
CaCO₃: precipitated calcium carbonate SOCAL ® 90A (Solvay)
CoPA: PLATAMID ® HX2507 (Arkema)
EVOH: SOARNOL ® A4412 (Nippon Goshei)

1.2. Implementation

The powder from the compositions of the examples/comparative examples obtained in 1.1 was applied to metal plates by fluidized-bed dipping, and coated metal plates were obtained.

1.3. Results

The coated metal plates from 1.2 were exposed to a salt fog. At the end of 2000 hours of exposure in accordance with the NFT 58-112 standard, the adhesion between the coating and the metal plate was measured. The exposed coatings of the coated plates were then dried for 72 hours at 35° C. At the end of this drying step, the adhesion was measured again. At the same time, tensile test pieces were cut out from a film produced with the compositions of the examples/comparative examples (at least two test pieces for each example/comparative example) and of the same thickness as the coating on the previously described metal plate. The test pieces were exposed to a salt fog for one week, next the wet-state tensile modulus was then measured for half the test pieces of each example/comparative example that had been exposed. The other half was dried at 35° C. for 72 hours and the dry tensile modulus was then measured for these test pieces. The values measured are given in Table 2.

TABLE 2

| | Adhesion after 2000 hours in salt fog, before drying | Adhesion after 2000 hours in salt fog, after drying | Wet modulus (W) in MPa | Dry-state modulus (D) in MPa | W/D ratio |
|---|---|---|---|---|---|
| Comparative ex. 1 | 0 | 0.5 | 1000 | 1800 | 0.55 |
| Comparative ex. 2 | 0 | 1 | 1300 | 2100 | 0.62 |
| Comparative ex. 3 | 0.5 | 3.5 | 1800 | 2600 | 0.69 |
| Example 4 | 3.5 | 3.5 | 2400 | 3000 | 0.80 |
| Example 5 | 3.5 | 3 | 2500 | 2900 | 0.86 |
| Comparative ex. 6 | 3.5 | 3.5 | 2350 | 3200 | 0.73 |

Compositions Example 4bis consisting of 750 parts of PA11, 80 parts of TiO₂, 250 parts of Platamid® HX2507 and X parts of CaCO₃ were made. Their wet modulus was measured according to the quantity (in parts) of CaCO₃. The corresponding points are represented in FIG. 1. It can be seen that from about 270 parts of CaCO₃, the wet module is greater than or equal to 2200 MPa [NF EN ISO 527 standard].

Comparative compositions without Platamid®, comparative 7, consisting of 750 parts of PA11, 80 parts of TiO₂ and X parts of CaCO₃ were made. Their wet modulus was measured according to the quantity (in parts) of CaCO₃.

The corresponding points are represented in FIG. 1.

BRIEF DESCRIPTION OF THE DRAWING

FIG. 1 shows the relationship of wet modulus v. calcium carbonate concentration.

The invention claimed is:

1. A self-adhesive pulverulent composition in powder form, suitable for the coating of metallic substrates, consisting of homopolyamide (A) that is PA11 or PA12, copolyamide (B), calcium carbonate in an amount of 270-400 parts by weight based on 1000 parts by weight of the total of homopolyamide (A) and copolyamide (B) and, at least one additive component said composition being devoid of silane-containing or of an adhesion promoter containing an epoxy, alcohol and/or carboxylic acid function, or a function group of their derivatives, said composition having a dry-state modulus and/or a wet-state modulus of greater than or equal to 2200 MPa [Standard NF EN ISO 527].

2. A composite material comprising a metal substrate directly covered by a coating layer resulting from the melting of said self-adhesive pulverulent composition in powder form of claim 1.

3. The composite material according to claim 2, wherein the adhesion of the coating layer to the metal substrate is greater than or equal to 3 after 2000 hours in salt fog, before and after drying, in accordance with the NFT 58-112 standard.

4. A metal substrate directly coated with the composition of claim 1, having no adhesion primer layer.

5. The composition of claim 1, wherein said additive component is a pigment or dye, an anti-crater agent or spreading agent, a reductant, an antioxidant, a reinforcing filler, a UV stabilizer, a fluidizing agent or a corrosion inhibitor.

6. The composition according to claim 5, wherein the reinforcing filler is talc, manganese carbonates, potassium or aluminum silicates, dispersed nanofillers, carbon nanotubes, silica or mixtures thereof.

* * * * *